United States Patent [19]

Smith

[11] 4,338,966

[45] Jul. 13, 1982

[54] DIRECT SOLENOID OPERATED DIRECTIONAL CONTROL VALVE

[75] Inventor: Robert H. Smith, Rochester, Mich.

[73] Assignee: Chrysler Corporation, Highland Park, Mich.

[21] Appl. No.: 228,843

[22] Filed: Jan. 26, 1981

Related U.S. Application Data

[62] Division of Ser. No. 10,649, Feb. 9, 1979, abandoned.

[51] Int. Cl.³ .............................................. F15B 13/044
[52] U.S. Cl. ............................. 137/596.17; 137/596.1; 137/625.65; 137/864; 137/870; 251/138; 335/274; 335/276
[58] Field of Search ............... 137/596.17, 596.1, 870, 137/596, 864; 251/138; 335/274, 275, 276

[56] References Cited

U.S. PATENT DOCUMENTS

| | | | |
|---|---|---|---|
| 2,904,071 | 9/1959 | Stein | 137/596 |
| 3,611,878 | 10/1971 | Puster | 251/138 X |
| 3,823,736 | 7/1974 | Vanti | 137/596.17 |
| 3,949,645 | 4/1976 | Masclet | 137/625.66 X |
| 4,142,683 | 3/1979 | Casey et al. | 251/138 X |
| 4,250,924 | 2/1981 | Sakakibara et al. | 137/596.17 X |

FOREIGN PATENT DOCUMENTS

| | | | |
|---|---|---|---|
| 2622400 | 12/1976 | Fed. Rep. of Germany | 137/864 |
| 1232546 | 10/1960 | France | 137/864 |
| 759171 | 10/1956 | United Kingdom | 137/596.17 |
| 856353 | 12/1960 | United Kingdom | 335/276 |

*Primary Examiner*—Gerald A. Michalsky
*Attorney, Agent, or Firm*—Newtson & Dundas

[57] ABSTRACT

A spherical valve member is moved within a housing between operative positions by direct application of supply pressure and operation of a solenoid arranged to maximize mechanical force imposed on the valve member while minimizing solenoid size and eliminating the use of movable close fitting cylindrical parts which can be subject to sticking in the presence of solid contaminants.

1 Claim, 4 Drawing Figures

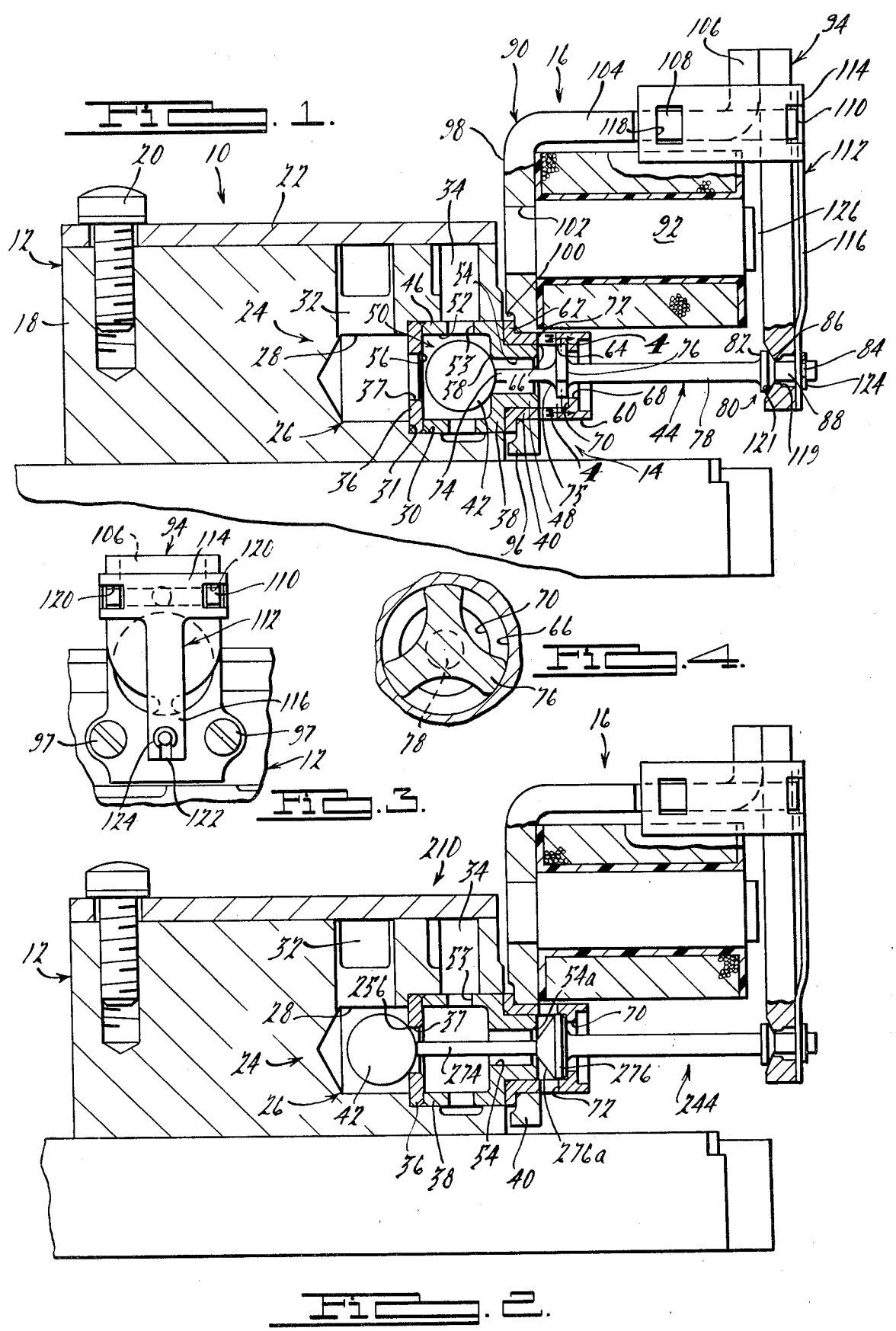

DIRECT SOLENOID OPERATED DIRECTIONAL CONTROL VALVE

This is a division, of application Ser. No. 010,649, filed Feb. 9, 1979, now abandoned.

BACKGROUND OF THE INVENTION

1. Field of Invention

The present invention relates generally to fluid directional control valves and more specifically to such valves which are electromagnetically operated.

2. Description of the Prior Art

In many fields of application of fluid power such as the field of automotive automatic transmission design, the use of directional control valves has been limited to those which employ cylindrical spools, spring biased and pressure activated. Such valves are generally close fit and therefore suffer greatly from their attendant intolerance of contamination which results in sticking. Recognition of this potential for unreliability can, in certain circumstances, dictate uneconomical redundancy in design. Furthermore, the spool-type valve does not lend itself well to use with electronic operators which are coming into increasing commercial use. Because of their contamination intolerance, direct actuation of such valves, as with solenoids, requires high force and massive structure, and pilot operation through a smaller intermediary valve increases cost and complexity.

It is well known in the art that ball-type valves are relatively contaminant tolerant, but their use in solenoid actuated applications has been primarily limited to relatively low force pilot valve applications rather than applications in which relatively large primary flow passes through the valve. The prior art devices also have shown the use of relatively large solenoids which conventionally operate against relatively high preload forces. They have also made use of close fit cylindrical parts moving in pressure fluid for ball actuation which detracts from the contaminant tolerance of the overall assembly. They have further permitted high contact stresses between the ball member and its associated actuator, which further detracts from reliability of the valve assembly. In addition, the prior art valves have been unduly complex and uneconomical to produce.

SUMMARY OF THE INVENTION

Responsive to the deficiencies in the prior art, it is an object of the present invention to provide a directly solenoid operated directional control valve that is resistant to sticking.

It is another object to provide such a valve which maximizes the actuation force and travel produced by the solenoid.

It is yet another object to provide such a valve which minimizes contact stresses in actuation.

It is still another object to provide such a valve which is simple and economical to produce.

According to one feature of the present invention, a solenoid operated directional control valve is provided which employs a minimal number of close fitting moving cylindrical parts.

According to another feature, the solenoid of the valve of the present invention is coupled to an actuating plunger for the valve portion with mechanical advantage and is arranged such that operation against large preload forces is not required.

According to yet another feature, contact between the valve operative structure and the actuating plunger therefore is maintained in the unactuated condition of operation to substantially prevent impact loading therebetween.

BRIEF DESCRIPTION OF THE DRAWINGS

These and other objects and features will become apparent upon reading the following detailed description with reference to the accompanying drawings in which:

FIG. 1 is a cross sectional view of one embodiment of the valve of the present invention in which pressure fluid from a source is normally applied to a fluid responsive element;

FIG. 2 is a cross sectional view of another embodiment of the valve of the present invention in which pressure fluid from a source is normally vented to a return line or reservoir;

FIG. 3 is a right end view of the valve of the present invention, certain parts being eliminated for clarity; and FIG. 4 is a cross sectional view taken through the guide portion of the plunger of the FIG. 1 embodiment along line 4—4.

DESCRIPTION OF THE PREFERRED EMBODIMENTS

The FIG. 1 Embodiment

Referring first to FIG. 1, the invention directional control valve 10 is illustrated in one preferred embodiment configured for installation in a fluid submerged environment such as the valve housing of an automotive automatic transmission as including generally a valve housing 12, a valve assembly 14 carried in the valve housing 12, and an actuating solenoid assembly 16 carried with the housing 12 and operatively engageable with the valve assembly 14.

The valve housing 12 is illustrated as including a ported body 18 to which is secured by screws 20 or the like a cover plate 22. An elongated valve chamber 24 is formed in the body 18 by a stepped bore 26 having a reduced diameter inner portion 28 and an enlarged diameter outer portion 30. A first passage 32 communicates with the valve chamber portion 28 and is connectable by means well known in the hydraulic arts with a source of pressurized fluid such as a transmission pump (not shown). A second passage 34 communicates with the valve chamber portion 30 and is connectable by similar means with a fluid responsive device such as a fluid actuating cylinder of an automotive automatic transmission (not shown).

Turning next to the valve assembly 14, it is illustrated as comprising a seat member 36, a retainer member 38, a guide member 40, a ball 42, and an actuating plunger 44. The seat member 36 is preferably formed as a disc having a central bore 37 and received in closely fitting diametral relationship in the enlarged diameter chamber portion 30, abutting the terminal shoulder 31 thereof.

The retainer member 38 includes a large diameter portion 46 which is likewise received in closely fitting diametral relationship in the enlarged diameter chamber portion 30 and abuts the seat member 36 to effect axial retention. The retainer member 38 also includes a reduced diameter neck portion 48 extending outward (rightward as viewed in FIG. 1) from the large diameter portion 46, and has formed through it a central stepped bore 50 having an enlarged diameter valve portion 52 traversed perpendicularly by a cross port 53 and a reduced diameter connecting portion 54. The inner terminus of portion 54 and the outer terminus of seat through bore 37 together form a pair of spaced, axially aligned valve seats 56, 58 for a purpose to be hereafter described.

The guide member 40 is formed as a substantially cylindrical member having an elongated solenoid mounting portion 60 and an inner terminal radially extending flange portion 62. It further includes a central through bore 64 having an inner portion 66 sized to receive the neck portion 48 of retainer member 38 in close fitting diametral relationship, a smaller plunger access portion 68, and a retaining shoulder 70 therebetween. A cross port 72 extends through the bore 64 at a position adjacent the outer terminus of the neck portion 48 of retainer member 38.

The ball member 42 is loosely carried within the enlarged diameter valve portion 52 of the retainer member 38 and is movable to selectively engage the valve seats 56, 58 in a manner to be hereafter described.

The plunger member 44 is carried for axial movement within the guide member 42 and is formed as an elongated rod having an actuating stem portion 74, a guide portion 76, an elongated rod portion 78, and a solenoid connecting portion 80.

The stem portion 74 is preferably cylindrical and passes along the axis of the connecting portion 54 of retainer stepped bore 50 to abuttingly engage the ball 42. Its outer terminus preferably includes a blend radius 75 to the larger diameter of the guide portion 76.

Guide portion 76 is preferably, but not necessarily formed as a generally cylindrical fluted structure (as may best be seen in FIG. 4) defining an outer diameter slidingly received in loose fitting relationship with the bore 64 of guide member 40 for movement between the shoulder 70 and the outer terminus of the retainer member 38. The mentioned fluted construction is preferred, since it minimizes the surface areas in sliding contact, thus reducing the tendency to stick; but in the FIG. 1 embodiment the critical functional limitation on the structure of the guide portion 76 is that it permit communication between the connecting bore portion 54 of retainer member 38 and at least the cross port 72 of guide member 40 when the guide portion 76 abuts the outer terminus of the retainer member 38.

Rod portion 78 is preferably cylindrical and extends outwardly from the guide portion 76 to the solenoid connecting portion 80.

Solenoid connecting portion 80 includes inner enlarged diameter portion 82 and outer retainer receiving groove 84. Inner portion 82 includes an outward facing chamfer 86 connecting its outer diameter with connecting portion 88.

Turning next to the solenoid assembly 16, it is illustrated as a clapper type solenoid including essentially a mounting bracket 90, a solenoid core assembly 92, and a clapper type armature 94.

The mounting bracket is preferably formed as a generally L-shaped member having a vertical (as shown in FIG. 1) leg 96 configured to be conventionally secured as by threaded fasteners 97, as seen in FIG. 3, to the valve body 18. The inner surface 98 of the leg 96 may include a recess 100 for receiving the flange portion 62 of guide member 40, thereby effecting axial retention of the valve assembly 14. It may also include an aperture 102 for conventionally receiving and retaining the core assembly 92. Extending outward from the vertical leg 96 is a generally horizontal leg 104, preferably including a portion 106 turned vertically to support the armature 94 providing a large flux area therewith. Notches 108 are formed in the sides of the leg 106, and the formation of the portion 106 leaves support posts 110 as may best be seen in FIG. 3.

The armature 94 is secured to the mounting bracket for pivotal movement thereabout by means of a special retaining member 112 formed as by stamping from a resilient material such as a spring steel and including a strap portion 114 and a leaf spring portion 116. Strap portion 114 includes apertures 118, 120. The former engage notches 108 in snap fit relationship, and the latter loosely receive the posts 110 to prevent rotation about the longitudinal axis of the horizontal leg 104.

The end of the armature 94 remote from its point of pivotal support on the vertical portion 106 is reduced in section as shown in FIG. 3 and includes a through aperture 119 sized to pass the connecting portion 88 of the plunger 44. A preferably chamfered surface 121 is formed at the inner terminus of the aperture 119 to cooperatively abuttingly engage the chamfered surface 86 of the plunger 44 to permit self-centering of the plunger 44 thereby resisting binding. It will be appreciated by those skilled in the art that other cooperating surface configurations such as matching spherical surfaces might be chosen for this purpose.

As may best be seen in FIG. 3, leaf spring portion 116 is slotted at its free end as indicated at 122 to receive connecting portion 88 of plunger 44. A conventional retaining ring 124 received in the groove 84 of the plunger 44 secures the assembly axially. The leaf spring portion 116 is formed at assembly to exert a small preload on the plunger 44 in the rightward direction as viewed in FIG. 1. Armature 94 is also formed by bending at assembly to provide a predetermined spacing 126 from the core assembly.

Operation of the FIG. 1 Embodiment

The directional control valve 10 of the present invention as exemplified in the FIG. 1 embodiment functions as a "normally applied" valve. Fluid under pressure from the unillustrated source, such as an automatic transmission's pump is introduced through the pressure port 32 into the valve chamber 24. It enters valve bore inner portion 28 and passes through the central bore 37 of seat member 36, around the ball 42, out the cross port 53 of retainer member 38, to the passage 34 whereby it is transmitted to a fluid responsive member. This flow path is established by the normal positioning of the parts illustrated in FIG. 1. Since the cross port 72 of guide member 40 is vented, pressurization of the passage 32 urges the ball 42 into sealing engagement with the seat 58 of retainer member 38.

Upon energizing the solenoid by applying an electrical potential from a suitable source (not shown), the armature 94 is drawn to reduce the gap 126, moving pivotally with respect to the mounting bracket 90 and rapidly driving with mechanical advantage the plunger 44, which is sized such that the stem portion 74 is in close juxtaposition with the ball 42 to prevent undesirable impact loading, to the outer terminus of retainer member 38. It thus moves and holds the ball 42 off the seat 58 and moves the ball 42 into sealing engagement with the seat 56 as the gap 125 is reduced. This blocks communication between the passages 32 and 34 and permits venting of the fluid responsive device. Fluid is exhausted from the passage 34 through the cross port 53 of retainer member 38, around the ball 42, through the connecting portion 54, and out the cross port 72 of guide member 40 (and along the bore 66 in the fluted configuration of FIG. 4) to vent. Upon de-energization of the solenoid 16, fluid under pressure returns the ball 42 to the position shown in FIG. 1, with leaf spring portion 116 of retainer 112 establishing the final, normal position of the guide portion 76 of the plunger 44 lightly urged against the shoulder 70 of guide member 40.

The FIG. 2 Embodiment

The direction control valve of FIG. 2 embodiment differs slightly from the FIG. 1 embodiment in that it employs a different plunger and arrangement of parts to permit operation as a "normally vented" valve. Parts identical to those of the FIG. 1 embodiment are identified by the same numeral used in the drawing figure. Modified parts are identified, where possible, by the FIG. 1 numerals preceded by the numeral 2.

In this embodiment, the ball 42 is positioned inwardly of the seat member 36 within the inner portion 28 of the stepped bore 26 and is sealingly engageable with the inner seat 256 defined by the central bore 37.

This modified plunger 244 includes a much elongated stem portion 274 for permitting its close juxtaposition with the ball 42 when the plunger 244 is urged against the shoulder 70 as shown in FIG. 2. The guide portion 276 of the plunger 244 includes a conical portion 276a sealingly engageable with the connecting passage 54 of retainer member 38 as at the illustrated lead chamfer 54a.

Operation of the FIG. 2 Embodiment

The unillustrated fluid responsive device is vented, as to an automatic transmission's sump when the directional control valve 210 of the FIG. 2 embodiment is in the position shown. Fluid may be exhausted through the passage 34, cross ports 53 of retainer member 38, the connecting portion 54 and cross ports 72 of guide member 40 to the sump. Pressurized fluid, introduced at passage 32 enters the inner bore portion 28 and, because the portion of valve chamber 24 outward of seat member 36 is vented, urges the ball 42 into sealing engagement with the seat 256 thereby blocking further communication.

Energization of the solenoid 16 as above described with reference to the FIG. 1 embodiment results in driving the chamfered portion 276a of plunger 244 into sealing engagement with the retainer member 38 while the ball 42 is upset from the seat 256. Thus, communication between the fluid responsive device and the sump is blocked and pressurized fluid may pass through the central bore 37, cross ports 53, and the passage 34 to the fluid responsive device.

While only certain embodiments of the directional control valve of the present invention have been described, those skilled in the solenoid operated valve arts will appreciate that other embodiments and modifications may be made without departing from the scope of the appended claims.

What is claimed is:

1. A normally vented solenoid operated directional control valve for a hydraulic fluid responsive device comprising:

A. a housing;

B. a stepped valve blind bore formed in said housing defining a reduced diameter inner portion and an enlarged diameter outer chamber portion;

C. first and second passage means formed in said housing at longitudinally spaced locations along the axis thereof and adapted to be connected to a source of pressurized fluid and a fluid responsive device, respectively, said first passage means communicating with said valve bore inner portion;

D. an hydraulic valve assembly comprising a seat member, a retainer member, a guide member, a ball and an actuating plunger; said seat member formed as a disc having a central bore, said seat member received in said chamber portion abutting the shoulder thereof, said retainer member including a large diameter portion and a reduced diameter neck portion formed with a central stepped through bore, defining an enlarged diameter valve portion and a reduced diameter connecting passage portion, said large diameter portion telescopically received in said stepped bore chamber portion, said enlarged diameter valve portion having cross ports communicating with said second passage means;

E. a central bore in said disc forming a first valve seat defined about the axis of said valve stepped blind bore intermediate said first and second passage means locations;

F. said ball carried in said reduced diameter inner portion intermediate said first passage means and said first valve seat and normally urged into a first position effecting sealing engagement with said first valve seat by said pressurized fluid;

G. a cylindrical guide member including an elongated solenoid mounting portion having a central through guide bore sized to telescopically receive therein said retainer neck portion, said guide bore arranged coaxially with said stepped valve through bore, said guide bore having a plunger access opening at its outer end and a stop shoulder intermediate its inner and outer ends, said guide member having cross ports therein, said retainer neck portion defining a second valve seat intermediate said second passage means and said guide member cross port;

H. said plunger member having a ball engaging tip portion, a chamfered valve portion, and a guide portion, said plunger member guide portion slidingly received in said guide bore and movable between a solenoid deenergized normal position wherein said tip portion is in close juxtaposition with said seated valve ball and a solenoid actuated position wherein said valve ball is driven by engagement of said plunger member tip portion to a second portion in said blind bore reduced diameter inner portion wherein said chamfered valve portion sealingly engages said said second valve seat to block fluid communication between said second passage means and said guide member cross ports;

I. a solenoid assembly including a clapper-type solenoid having bracket means attaching said solenoid to said guide member elongated mounting portion, said solenoid selectively operative to exert force along an axis parallel to but spaced from said stepped bore longitudinal axis;

J. said solenoid including armature means pivotally connected to said solenoid bracket means for reciprocal movement with respect thereto responsive to said solenoid force;

K. armature retaining means for pivotally connecting said armature means to said plunger member whereby reciprocal pivotal movement of said armature means effects said axial movement of said plunger member and said driving abutting engagement of said ball to said second position;

L. said armature connecting means including a retaining member having a substantially U-shaped strap portion for securing said armature means to said bracket means and a leaf spring portion extending perpendicularly from said strap portion, said leaf spring operative to urge said plunger member guide portion into contact with said guide bore stop shoulder such that said leaf spring establishes the normal position of said plunger guide portion to locate said stem portion in juxtaposition with said ball to obviate impact loading of said ball; and M. said plunger member having a rod portion extending outwardly from said plunger guide portion and terminating in a plunger connecting portion, said rod portion having a large diameter portion defining an outwardly facing chamfer joined at its outer diameter with said plunger connecting portion, said armature having a through aperture at its free end remote from its point of pivotal support on said bracket means, said through aperture inner terminus formed with a chamfer sized to cooperatively abuttingly engage said rod portion outwardly facing chamfer, effecting self-centering of said plunger member relative to said fluid chamber longitudinal axis, whereby when said solenoid is deenergized pressurized fluid is normally vented from said fluid responsive device through said second passage means, said retainer member cross ports, said retainer member central bore large diameter valve portion and said retainer member connecting passage for venting from said guide member cross port.

* * * * *